United States Patent [19]
Fox et al.

[11] Patent Number: 5,590,019
[45] Date of Patent: Dec. 31, 1996

[54] DEVICE FOR CHANGE-OVER SWITCHING OF INDIVIDUAL ELECTRIC MOTORS OR GROUPS OF ELECTRIC MOTORS

[75] Inventors: Siegfried Fox, Xanten; Andreas Keil, Krefeld, all of Germany

[73] Assignee: Palitex Project-Company GmbH, Krefeld, Germany

[21] Appl. No.: 560,319

[22] Filed: Nov. 17, 1995

[30] Foreign Application Priority Data

Nov. 19, 1994 [DE] Germany ............................ 44 41 209.6

[51] Int. Cl.$^6$ .................................................. H02B 1/04
[52] U.S. Cl. ......................... 361/643; 310/68 A; 361/835; 361/837
[58] Field of Search ...................................... 310/68 A, 71; 361/600, 601, 610, 614, 622, 626, 642, 643, 833, 834, 835, 837

[56] References Cited

U.S. PATENT DOCUMENTS 3,790,861  2/1974  Sakats ....................................... 361/626

FOREIGN PATENT DOCUMENTS 3823574  11/1989  Germany .

*Primary Examiner*—Gregory D. Thompson
*Attorney, Agent, or Firm*—Robert W. Becker & Associates

[57] ABSTRACT

A device for change-over switching of electric motors has a housing and two safety disconnecting switch systems positioned adjacently to one another in the housing. A cover is slidably connected to the housing so as to cover one of the safety disconnecting switch systems respectively. A fuse holder with fuses is detachably connected to the housing. Each one of the safety disconnecting switch systems has receiving elements for receiving the fuses. The safety disconnecting switch systems are electrically connected to one another such that upon insertion of the fuses into the receiving elements of one of safety disconnecting switch systems the electric motors rotate in one rotational direction and that upon insertion of the fuses into the receiving elements of the other one of the safety disconnecting switch systems the electric motors rotate in the other rotational direction. The fuse holder is detachably connected to the housing adjacent to the cover such that the cover covers one of the safety disconnecting switch systems and that the fuses are inserted into the other one of the safety disconnecting switch systems.

2 Claims, 3 Drawing Sheets

5,590,019

DEVICE FOR CHANGE-OVER SWITCHING OF INDIVIDUAL ELECTRIC MOTORS OR GROUPS OF ELECTRIC MOTORS

BACKGROUND OF THE INVENTION

In the drive technology there are many examples in which for operational reasons the working machine require the change-over of rotational direction of electric motors. In order to prevent an accidental or unintentional change-over of the set rotational direction of a drive motor, it is necessary to provide safety means in the form of key switches and visual displays.

Technically, the change-over switching of electric motors is achieved with conventional motor reversing contactors that can be electrically and/or mechanically locked relative to one another as is, for example, known from German Patent 38 23 574. The switching for the change-over of the rotational direction with respect to technical aspects is satisfactory and also easy to operate; however, this approach requires high expenditures and, in general, is not an economic solution.

One field of application for change-over switching is, for example, spinning and twisting machines, especially two-for-one twisting machines. As a function of whether a so-called S or Z twisted yarn is to be produced, the rotational direction of the spindles must be reversed. In most cases the drive of spinning or twisting machines is achieved with one or more interconnected electric motors whereby the torque is, in general, transmitted with a tangential drive belt to the individual working locations, i.e., the spindles.

It is therefor an object of the present invention to provide a simple and reliable device for change-over switching of individual electric motors or groups of electric motors, especially for spinning or twisting machines, with which the aforementioned components such as key switches, visual indicators, and reversing contactors are obsolete.

SUMMARY OF THE INVENTION

A Device for change-over switching of electric motors according to the present invention is primarily characterized by:

A housing;

Two safety disconnecting switch systems positioned adjacently to one another in said housing;

A cover slidably connected to the housing so as to cover one of the safety disconnecting switch systems;

The cover slidably connected to the housing so as to cover one of the safety disconnecting switch systems, respectively;

A fuse holder detachably connected to the housing;

Fuses connected to the fuse holder;

Each one of the safety disconnecting switch systems comprising receiving means for receiving the fuses;

The safety disconnecting switch systems electrically connected to one another such that upon insertion of the fuses into the receiving means of one of the safety disconnecting switch systems the electric motors rotate in one direction of rotation and that upon insertion of the fuses into the receiving means of the other one of the safety disconnecting switch systems the electric motors rotate in the other direction of rotation; and Wherein the fuse holder is detachably connected to the housing adjacent to the cover such that the cover covers one of the safety disconnecting switch systems and that the fuses are inserted into the receiving means of the other one of the safety disconnecting switch systems.

Preferably, the housing is U-shaped and comprises a base and two legs. The safety disconnecting switch systems are preferably connected to the base. The housing further comprises two rods connected to the legs so as to extend parallel to one another between the legs. The cover is displaceably guided on the rods.

According to the present invention the device for change-over switching of individual electric motors or of groups of electric motors with safety disconnecting switches, especially pivotable disconnecting switches with two safety disconnecting switch systems arranged adjacently to one another in a common housing, which are connected electrically to one another such that upon insertion of the fuses into one of the disconnecting switch systems the electric motor(s) rotate(s) in one direction of rotations while upon insertion of the fuses to the other disconnecting switch system the electric motor(s) rotate(s) in the other direction of rotation. A cover is connected to the housing so as to be displaceable and to cover only one of the two disconnecting switch systems, such that fuses connected to one single fuse holder can be inserted only into one of the two disconnecting switch systems.

In this manner it is possible to perform with simple means a change-over of rotational direction whereby the insertion of fuses into both disconnecting switch systems at the same time is mechanically prevented due to the displaceable cover.

Inventively, the housing has preferably a U-shape and its base has connected thereto the two safety disconnecting switch systems whereby between the two legs of the U-shaped housing two parallel rods extend on which the cover is displaceably guided.

BRIEF DESCRIPTION OF THE DRAWINGS

The object and advantages of the present invention will appear more clearly from the following specifications in conjunction with the accompanying drawings, in which.

DESCRIPTION OF PREFERRED EMBODIMENT

Figure 1:
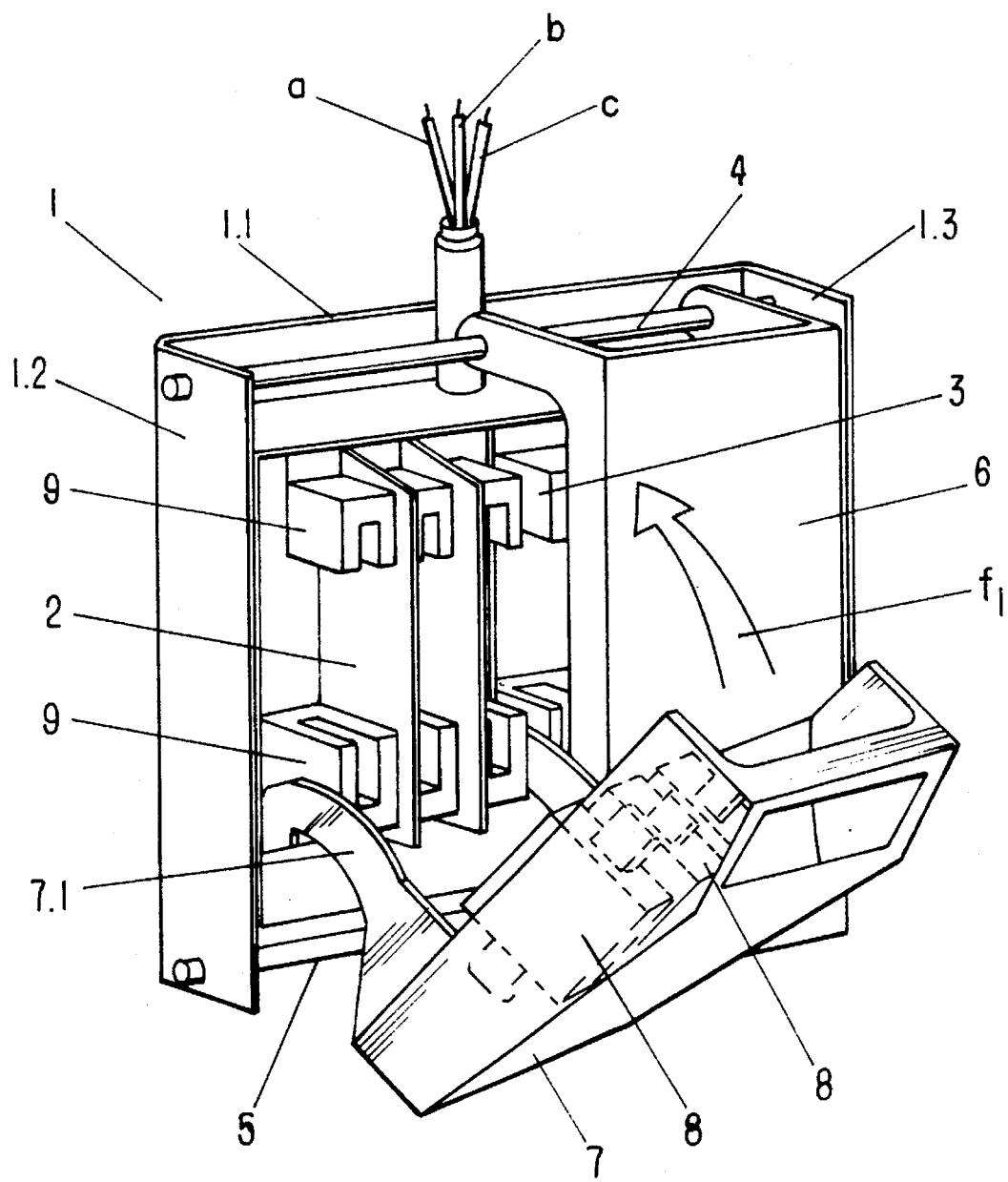
FIG. 1 shows a frontal perspective view of the inventive change-over device.

The present invention will now be described in detail with the aid of a specific embodiment utilizing FIGS. 1 through 4.

The inventive device is especially designed as a low voltage power fuse for switching the rotational direction of three phase current-driven short-circuit motors. Two adjacently arranged safety disconnecting switches are electrically connected such that upon insertion of fuses into one of the disconnecting switch systems the electric motor(s) rotate(s) in one rotational direction while upon insertion of the fuses into the other disconnecting switch systems the electric motor(s) rotate(s) in the other rotational direction.

Since the insertion of fuses into both disconnecting switch systems would result in a short circuit, this is prevented inventively by mechanical locking in the form of a displaceable cover, especially plastic cover, and by providing only a single removable (pivotable) holder for receiving the fuses at the cover.

The inventive device is comprised substantially of a housing 1 in the form of a U-shape whereby the base 1.1 receives the two safety disconnecting switch systems 2, 3 with corresponding electrical connection. Between the two legs of 1.2, 1.3 of the U-shaped housing two parallel extending rods 4 and 5 are provided on which the cover 6 is placeable guided.

A fuse holder 7 which is supplied with a plurality of fuses 8 is a conventional part that can be suspended with hook-shaped parts 7.1 at the housing at the location of one of the individual safety disconnecting switch systems. By pivoting the fuse holder 7 in the direction of arrow f1 the individual fuses 8 can be inserted into the respective receiving means 9 which are electrically connected to one another in the aforementioned manner as schematically represented in FIGS. 3 and 4. The fuse holder 7 at its front side is designed such that when it is inserted and pivoted into the housing 1 a displacement of the lid 6 is not possible. The fuse holder 7 is comprised at least partially of transparent materials so that, in the position shown in FIG. 2 in which it is folded into the housing 1, the fuses 8 within the fuse holder 7 are visible.

The cover 6 is provided with S and Z markings in order to, for example, indicate the rotational direction of the spindle drive motor or motors for S or Z-twisted yarns in the case of spinning and twisting machines.

According to FIG. 3 the electrical lines a, b, and c extending from the upper part of the housing 1 are guided to a main switch box 10 while electrical lines a1, b1, and c1 are guided to clamped connection at the lower portion of the housing 1 by interposing a star-delta protective connection 11.

Figure 2:
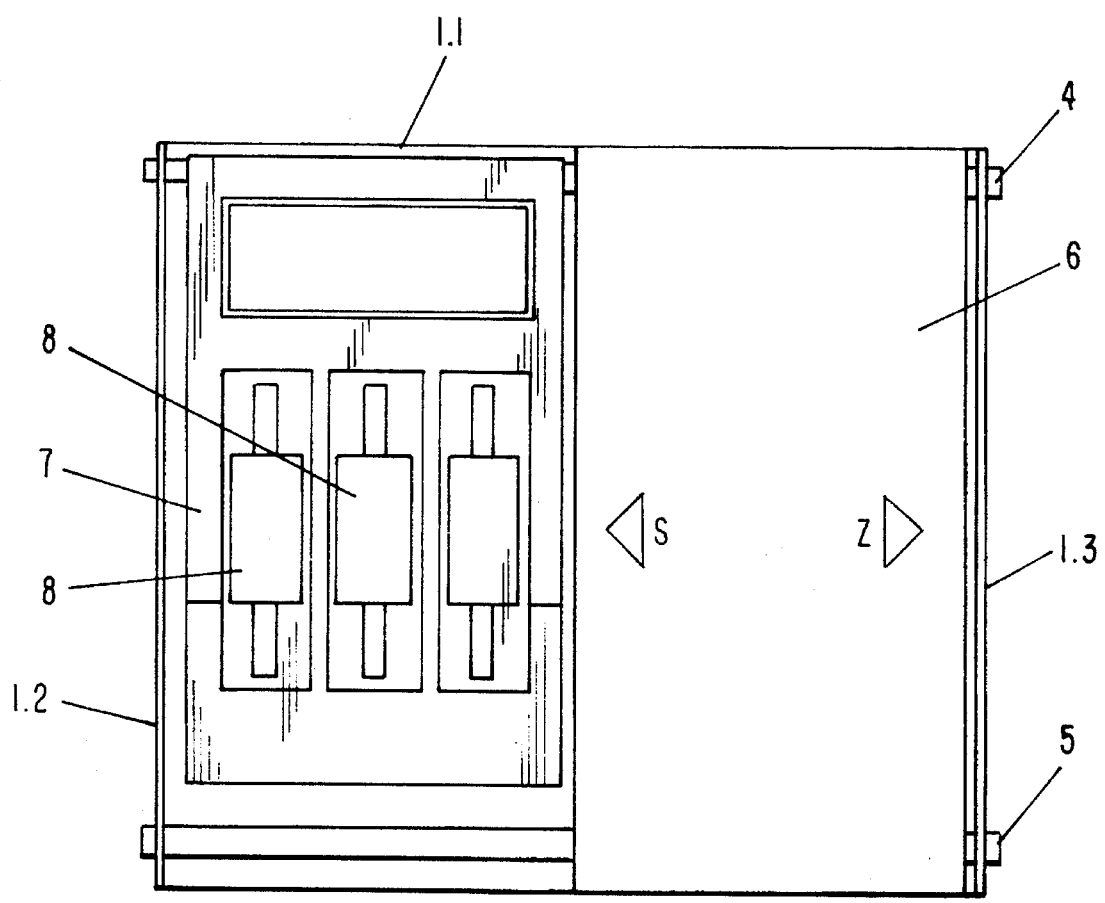
FIG. 2 shows a front view of the inventive device.
Figures 3, 4:
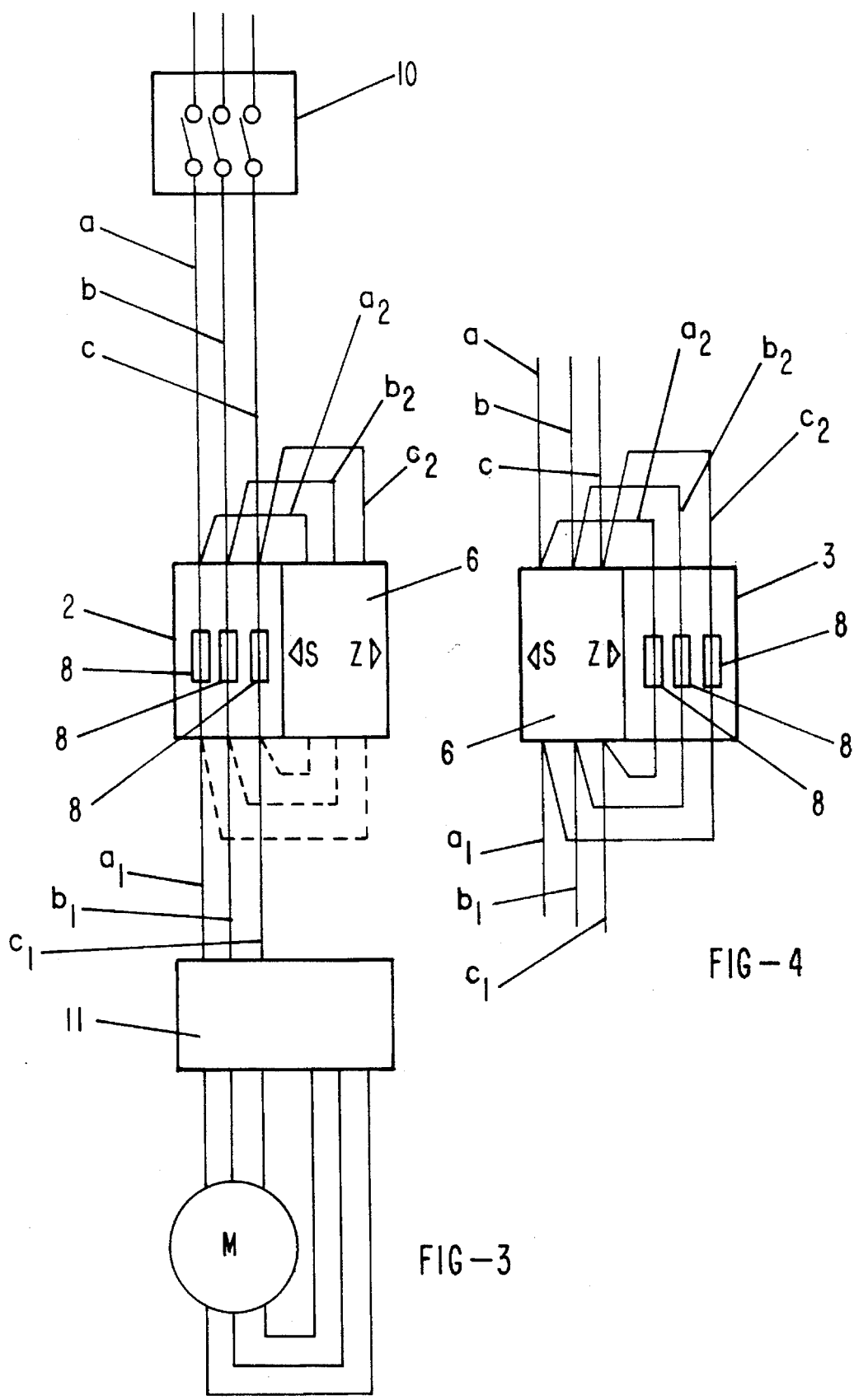
FIG. 3 shows the switching diagram for one direction of rotation.
FIG. 4 shows a switching diagram for the opposite direction of rotation.

The state represented in FIG. 3 corresponds to the state according to FIG. 2, i.e., the fuses 8 positioned within the fuse holder 7 are inserted into the safety disconnecting switch system 2 positioned within the left half of the housing 1 so that for one of the rotational directions of the motor M the following connections are provided: line a—line a1; line b—line b1; and line c—line c1. The cover 6 covers the safety disconnecting switch system 3 positioned within the right half of the housing 1.

According to FIG. 4 the fuse holder 7 is folded into the safety disconnecting switch system 3 within the housing 1 so that the fuses 8 provide via auxiliary lines a2, b2, and c2 the following connections for change-over of the rotational direction of the motor M: line a—line a2—line c1; line b—line b2—line b1; and line c—line c2—line a1. In this case the cover 6 covers the safety disconnecting switch system 2 positioned in the left half of the housing 1.

The present invention is, of course, in no way restricted to the specific disclosure of the specification and drawings, but also encompasses any modifications within the scope of the appended claims.

What we claim is:

1. A device for change-over switching of electric motors, said device comprising:

a housing;

two safety disconnecting switch systems positioned adjacently to one another in said housing;

a cover slidably connected to said housing so as to cover one of said safety disconnecting switch systems respectively;

a fuse holder detachably connected to said housing;

fuses connected to said fuse holder;

each one of said safety disconnecting switch systems comprising receiving means for receiving said fuses;

said safety disconnecting switch systems electrically connected to one another such that upon insertion of said fuses into said receiving means of one of said safety disconnecting switch systems the electric motors rotate in one direction of rotation and that upon insertion of said fuses into said receiving means of the other one of said safety disconnecting switch systems the electric motors rotate in the other direction of rotation; and wherein said fuse holder is detachably connected to said housing adjacent to said cover such that said cover covers one of said safety disconnecting switch systems and that said fuses are inserted into the receiving means of the other one of said safety disconnecting switch systems.

2. A device according to claim 1, wherein:

said housing is U-shaped and comprises a base and two legs;

said safety disconnecting switch systems are connected to said base;

said housing further comprising two rods connected to said legs so as to extend parallel to one another between said legs; and said cover displaceably guided on said rods.

* * * * *